(12) United States Patent
Brennenstuhl et al.

(10) Patent No.: US 10,940,580 B2
(45) Date of Patent: Mar. 9, 2021

(54) HAND-HELD POWER TOOL WHICH INCLUDES A TORQUE CLUTCH

(71) Applicant: Robert Bosch GmbH, Stuttgart (DE)

(72) Inventors: Jens Brennenstuhl, Albershausen (DE); Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 623 days.

(21) Appl. No.: 14/950,161

(22) Filed: Nov. 24, 2015

(65) Prior Publication Data
US 2016/0158929 A1 Jun. 9, 2016

(30) Foreign Application Priority Data

Dec. 4, 2014 (DE) ...................... 10 2014 224 931.7

(51) Int. Cl.
*B25F 5/00* (2006.01)
*B25B 21/02* (2006.01)
*B25B 21/00* (2006.01)
*B25B 23/14* (2006.01)
*B25D 16/00* (2006.01)
*F16D 43/20* (2006.01)

(52) U.S. Cl.
CPC .............. *B25F 5/001* (2013.01); *B25B 21/00* (2013.01); *B25B 21/023* (2013.01); *B25B 23/141* (2013.01); *B25D 16/003* (2013.01); *B25D 16/006* (2013.01); *F16D 43/20* (2013.01)

(58) Field of Classification Search
USPC .................................................... 173/48, 216
See application file for complete search history.

(56) References Cited

U.S. PATENT DOCUMENTS

2009/0101376 A1* 4/2009 Walker .................... B25B 21/00
173/47
2010/0071923 A1* 3/2010 Rudolph ................. B25B 21/00
173/48

(Continued)

FOREIGN PATENT DOCUMENTS

CN 1098353 A 2/1995
CN 1446139 A 10/2003

(Continued)

*Primary Examiner* — Anna K Kinsaul
*Assistant Examiner* — Chinyere J Rushing-Tucker
(74) *Attorney, Agent, or Firm* — Norton Rose Fulbright US LLP; Gerard Messina (57) ABSTRACT

In a hand-held power tool, a torque clutch associated with an output spindle, a transmission element axially displaceable in the direction of a longitudinal center axis of the output spindle, a locking element axially immovable in the direction of the longitudinal center axis and movable in a plane transverse to the longitudinal center axis, for activating and deactivating the torque clutch, the locking element enabling, in at least a first operating position, axial displaceability of the transmission element in the direction of the longitudinal center axis to activate the torque clutch, and in at least a second operating position, for at least limiting the axial displaceability of the transmission element to deactivate the torque clutch, in the second operating position of the locking element, the output spindle being at least essentially axially immovable relative to the gear housing in the direction of the longitudinal center axis.

19 Claims, 5 Drawing Sheets

(56) References Cited

U.S. PATENT DOCUMENTS

| | | | |
|---|---|---|---|
| 2010/0163261 A1* | 7/2010 | Tomayko | B23B 45/008 173/47 |
| 2011/0017484 A1* | 1/2011 | Roehm | F16D 43/206 173/178 |
| 2011/0147024 A1* | 6/2011 | Herr | B25B 23/141 173/48 |
| 2013/0161040 A1* | 6/2013 | Tomayko | B23B 45/008 173/47 |
| 2013/0333907 A1* | 12/2013 | Hecht | B25D 16/006 173/48 |
| 2014/0209339 A1* | 7/2014 | Herr | B25B 23/141 173/48 |
| 2015/0202759 A1* | 7/2015 | Wang | B25D 16/006 173/47 |
| 2018/0029214 A1* | 2/2018 | Brennenstuhl | B23B 31/16 |

FOREIGN PATENT DOCUMENTS

| | | |
|---|---|---|
| CN | 1789741 A | 6/2006 |
| DE | 10 2009 054 925 | 6/2011 |
| DE | 10 2009 054 931 A1 | 6/2011 |
| EP | 1632313 A1 | 3/2006 |
| EP | 2 216 114 A2 | 8/2010 |
| WO | 2007/135107 A1 | 11/2007 |
| WO | 2012/084428 A1 | 6/2012 |

* cited by examiner

HAND-HELD POWER TOOL WHICH INCLUDES A TORQUE CLUTCH

RELATED APPLICATION INFORMATION

The present application claims priority to and the benefit of German patent application no. 10 2014 224 931.7, which was filed in Germany on Dec. 4, 2014, the disclosure of which is incorporated herein by reference.

FIELD OF THE INVENTION

The present invention relates to a hand-held power tool, in particular a screwdriver or a screw drill, which includes a gear, situated in a gear housing, for driving an output spindle, and a torque clutch associated with the output spindle, a transmission element which is axially displaceable in the direction of a longitudinal center axis of the output spindle being provided.

BACKGROUND INFORMATION

A drill is discussed in DE 10 2009 054 925 A1 which includes a tool receptacle which is coupled to a drive motor via an output spindle provided with a torque clutch. The torque clutch has a first adjusting ring, which via an adjusting nut cooperates with at least one clamping element which applies a pretensioning force to a pressure plate, and a spring retainer in order to specify a work-specific torque limiting within predefined limits via the first adjusting ring, and thus activate the torque clutch in an associated screwdriving mode, or when the pretensioning force is further increased, to axially lock the pressure plate indirectly via the spring retainer, and thus specify a drilling mode in which the torque clutch is deactivated. In addition, with the aid of a second adjusting ring and a cam ring which cooperates with same, axial displaceability of the output spindle, and at the same time, deactivation of the torque clutch, is adjustable by direct locking of the pressure plate by the cam ring, a so-called percussion drilling mode being set when the output spindle is axially movable, and the drilling mode or screwdriving mode being set when the output spindle is axially fixed, depending on the adjustment of the first adjusting ring.

A disadvantage of the related art is that, due to the only indirect axial locking of the pressure plate via the spring retainer, the drilling mode is settable with only limited reliability, and under very specific use conditions, thus also in the drilling mode, so-called "slipping" of the torque clutch is possible.

SUMMARY OF THE INVENTION

An object of the present invention, therefore, is to provide a novel hand-held power tool, in particular a screw drill, a screwdriver, or a percussion drill screwdriver, in which slipping of the torque clutch in a drilling mode may be reliably prevented, and in which an axially compact configuration and low actuating forces for activating or deactivating the torque clutch are to be provided.

This object may be achieved by a hand-held power tool, in particular a screwdriver or screw drill, which includes a gear, situated in a gear housing, for driving an output spindle, and a torque clutch associated with the output spindle, a transmission element which is axially displaceable in the direction of a longitudinal center axis of the output spindle being provided, a locking element, which is axially immovable in the direction of the longitudinal center axis and which is movable in a plane transverse to the longitudinal center axis, being provided for activating and deactivating the torque clutch, the locking element being configured for enabling, in at least a first operating position, axial displaceability of the transmission element in the direction of the longitudinal center axis in order to activate the torque clutch, and in at least a second operating position, for at least limiting the axial displaceability of the transmission element in order to deactivate the torque clutch, in the second operating position of the locking element, the output spindle being at least essentially axially immovable relative to the gear housing in the direction of the longitudinal center axis. The transmission element may be accommodated, secured against rotation, in the hand-held power tool.

The present invention thus allows the provision of a novel hand-held power tool which includes a torque clutch, in particular a screwdriver or screw drill, in which reliable activation and deactivation of the torque clutch is achieved with comparatively small activation and deactivation forces and paths. A particular torque level of the torque clutch may be settable for work-specific torque limiting within predefined limits via an associated control element. In addition, the hand-held power tool may be easily used in two different operating modes, for example the torque clutch being activated in a screwdriving mode and being deactivated in a drilling mode.

According to one specific embodiment, the locking element is configured at least for limiting, in at least a third operating position, the axial displaceability of the transmission element in order to deactivate the torque clutch, the output spindle in the third operating position of the locking element being axially movable relative to the gear housing in the direction of the longitudinal center axis.

The hand-held power tool may thus be safely and reliably used in an additional operating mode in which the torque clutch is likewise deactivated, for example in a percussion drilling mode.

The first operating position may be associated with a screwdriving mode, the second operating position is associated with a drilling mode, and the third operating position is associated with a percussion drilling mode.

Multifunctionality of the torque clutch is provided in this way.

According to one specific embodiment, the locking element is a locking ring which is rotatable about the longitudinal center axis.

A structurally simple configuration and smooth operation of the locking element are thus made possible.

The locking ring may be accommodated, secured against rotation, in an associated adjusting element.

A reliable mechanical coupling between the adjusting element and the locking ring is ensured in this way.

The gear may be configured in the manner of a planetary gear, at least one detent cam being formed on an annulus gear of a gear stage of the planetary gear facing the torque clutch.

Due to the integral configuration of the detent cams on the annulus gear of the gear stage facing the torque clutch, the axial installation space of the torque clutch may be reduced.

At least one detent body may be situated between the annulus gear and a side of the transmission element facing the annulus gear, and the transmission element is axially pretensioned against the annulus gear with the aid of at least one compression spring, the at least one compression spring resting against a side of the transmission element facing away from the gear and being supported on an associated spring retainer.

A configuration of the torque clutch which is comparatively structurally simple and at the same time robust and largely resistant to wear is thus achievable.

An axial position of the spring retainer may be settable with the aid of an adjusting ring, which is rotatable about the longitudinal center axis of the output spindle, in order to adjust axial pretensioning of the at least one compression spring.

The maximum torque that is transmittable by the torque clutch, above which the torque clutch slips during operation, may be set in this way.

At least one support element which points in the direction of the transmission element may be formed on the locking element.

Due to the support element which may be configured as an elevation, the axial lifting motion of the detent body or of the transmission element is limited when the torque clutch is deactivated.

According to one advantageous refinement, the transmission element includes at least one recess.

As a result, during operation of the torque clutch, the support element may engage in a corresponding recess, thus making torque limiting by the torque clutch possible.

According to another embodiment, the locking element includes at least one outwardly directed extension.

The rotation of the locking ring is thus made possible with the aid of the exterior, ring-shaped adjusting element to be actuated by the user. In addition, the locking element may have at least one radial, inwardly directed recess which is used for mounting the locking element on the gear housing.

In one refinement, the gear housing has, at least in sections, a groove with at least one supporting rib for accommodating the locking element on its outer periphery.

Accommodation of the locking element is thus provided, the supporting rib being used for directly transferring the axial forces which occur into the gear housing. Alternatively, a support geometry may be achieved by additional components which prevent a movement of the locking element in the direction of the longitudinal center axis of the output spindle.

When the torque clutch is deactivated, the support element of the locking element may limit an axial lift of the detent body and of the transmission element in a direction facing away from the gear, in such a way that the detent body rests, at least in areas, against the detent cam of the annulus gear in order to deactivate the torque clutch.

Due to this configuration, when the torque clutch is deactivated, the hand-held power tool may transmit the maximum torque which is generatable by the drive motor to the insertion tool, for example a drill bit or the like.

According to one advantageous embodiment, when the torque clutch is activated, the support element on the locking element engages, at least in areas, in the recess in the transmission element in such a way that the detent body skips over the detent cam when a preset torque is exceeded.

When the torque clutch is activated, for example during screwdriving, the torque which is generated by the drive motor and transmitted to the insertion tool may be limited to a predefined value, for example to ensure a defined tightening torque of a screw.

According to one refinement, the locking element is directly or indirectly lockable when the torque clutch is activated.

Uncontrolled changeover operations between the operating modes of the hand-held power tool may be reliably prevented in this way.

The present invention is explained in greater detail in the following description with reference to exemplary embodiments illustrated in the drawings. In the drawings, the same structural elements having identical functionalities in each case have the same reference numerals, and are generally described only once.

DETAILED DESCRIPTION

Figure 1:
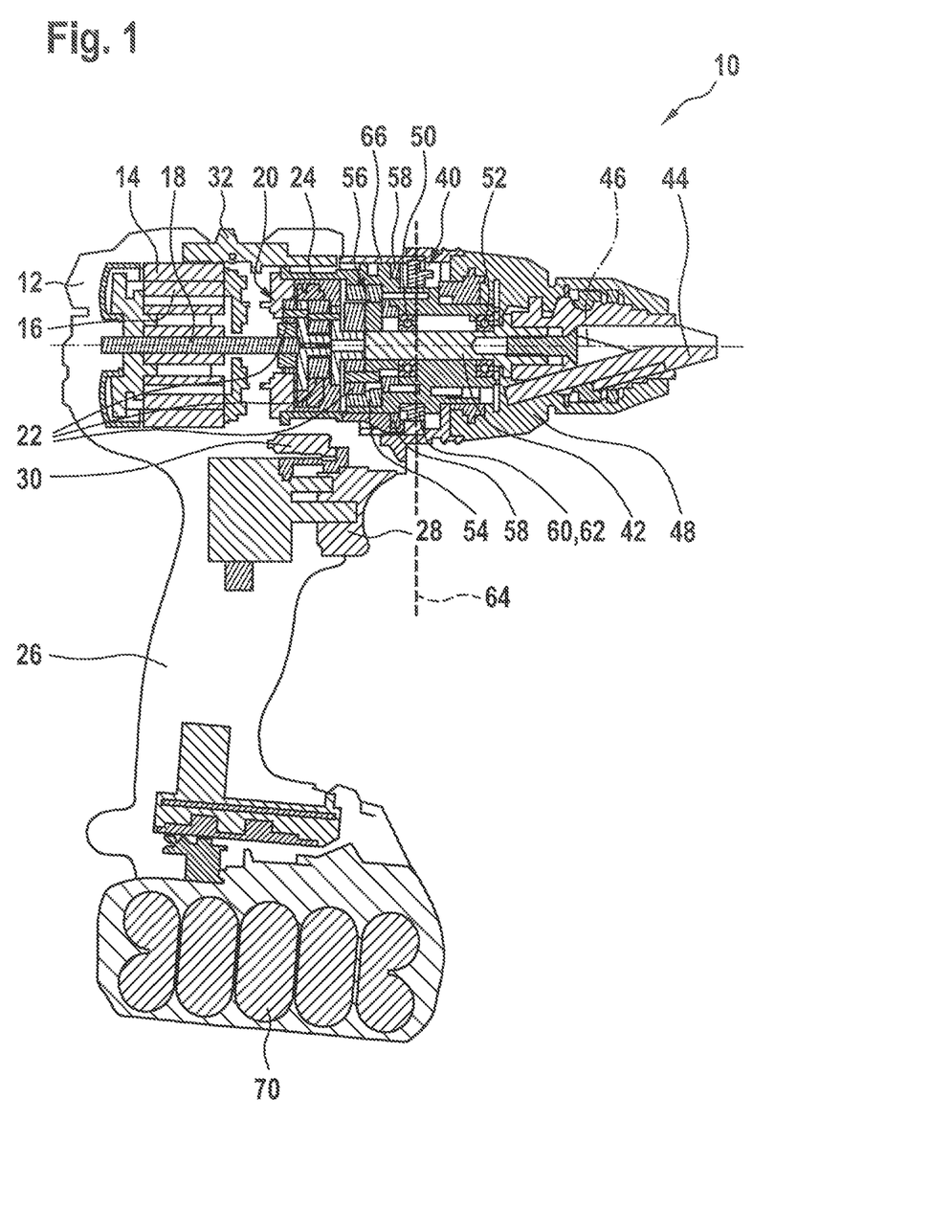
FIG. 1 shows a longitudinal section of a hand-held power tool which includes a torque clutch according to the present invention which has a screwdriving mode and a drilling mode.

FIG. 1 shows a hand-held power tool 10 which includes a torque clutch 40 according to the present invention, and which is configured as a cordless screw drill as an example. In this regard, hand-held power tool 10, as an example, is mechanically and electrically connectable to a rechargeable battery pack 70 for supplying power independently of the power grid. However, it is pointed out that the present invention is not limited to a cordless screw drill, and instead may be used for different hand-held power tools, for example a screwdriver, a percussion screwdriver, or a percussion drill, in which torque clutch 40 according to the present invention may be used, regardless of whether the hand-held power tool is operable electrically, i.e., dependent on the power grid or independently of the power grid with rechargeable battery pack 70, or nonelectrically.

Hand-held power tool 10 includes a tool housing 12, in which in the illustration an electric drive motor 14 is situated, the stator 16 of which drives a gear 20 with the aid of an associated drive shaft 18, the gear may be configured as a multistage planetary gear 22, and being situated in a separate gear housing 24, secured against rotation, situated in tool housing 12. Alternatively, use of separate gear housing 24 may be dispensed with.

Electric drive motor 14 may be any type of motor, for example an electronically commutated motor or a direct current motor. Drive motor 14 may be electronically controllable or regulatable in such a way that a change in rotational direction as well as specification of a desired rotational speed is settable.

Tool housing 12 also includes a handle 26 with a manual switch 28 for switching drive motor 14 on and off, and for continuously variable speed control of the drive motor. In addition, a rotational direction switch 30 for changing the rotational direction of drive motor 14 or drive shaft 18 is provided on handle 26. Furthermore, a gear change switch 32 for changing over between the individual gears of planetary gear 22 is positioned on the top side of tool housing 12.

Planetary gear 22 may drive an output spindle 42 via a torque clutch 40, a tool receptacle 44 for accommodating an insertion tool (not illustrated), for example a drill bit or a screwdriver bit, being situated on the free axial end of the output spindle. The torque above which the torque clutch slips may be variable with the aid of an adjusting ring 48 which is rotatable by the user, which may be in a locking manner, about a longitudinal center axis 46. Output spindle 42 is rotatably accommodated in a first bearing and a second bearing 50, 52 in the case of the screw drill illustrated in FIG. 1, bearing 52 which faces tool receptacle 44 being axially immovable.

Torque clutch 40 is coupled to an annulus gear 54 of a last gear stage 56 of planetary gear 22 facing torque clutch 40. Torque clutch 40 may include a transmission element 58 which is axially displaceable in the direction of longitudinal center axis 46, and a locking element 60. Transmission element 58 may be situated, secured against rotation, in hand-held power tool 10, which may be situated, secured against rotation, on gear housing 24.

Locking element 60 may be movable in a plane 64 which extends transversely with respect to longitudinal center axis 46, while transmission element 58 is displaceable in parallel to longitudinal center axis 46. According to one specific embodiment, locking element 60 is configured as a locking ring 62. This locking ring 62 may be accommodated, secured against rotation, in an associated adjusting element 66 which is likewise actuatable by the user by rotating it about longitudinal center axis 46.

Locking ring 62 in a first operating position enables the axial displaceability of transmission element 58 in order to activate torque clutch 40, while locking ring 62 in its second operating position at least limits, and may completely block, the axial movability of transmission element 58 in order to deactivate torque clutch 40. The first operating position may be associated with a screwdriving mode (torque clutch active or activated) of hand-held power tool 10, and in the second operating position, hand-held power tool 10 may be in a drilling mode (torque clutch inactive or deactivated). In the position illustrated in FIG. 1, locking ring 62 is in its first operating position; i.e., torque clutch 40 is active and hand-held power tool 10 may be operated in the screwdriving mode, the axial displaceability of transmission element 58 being enabled.

Figure 2:
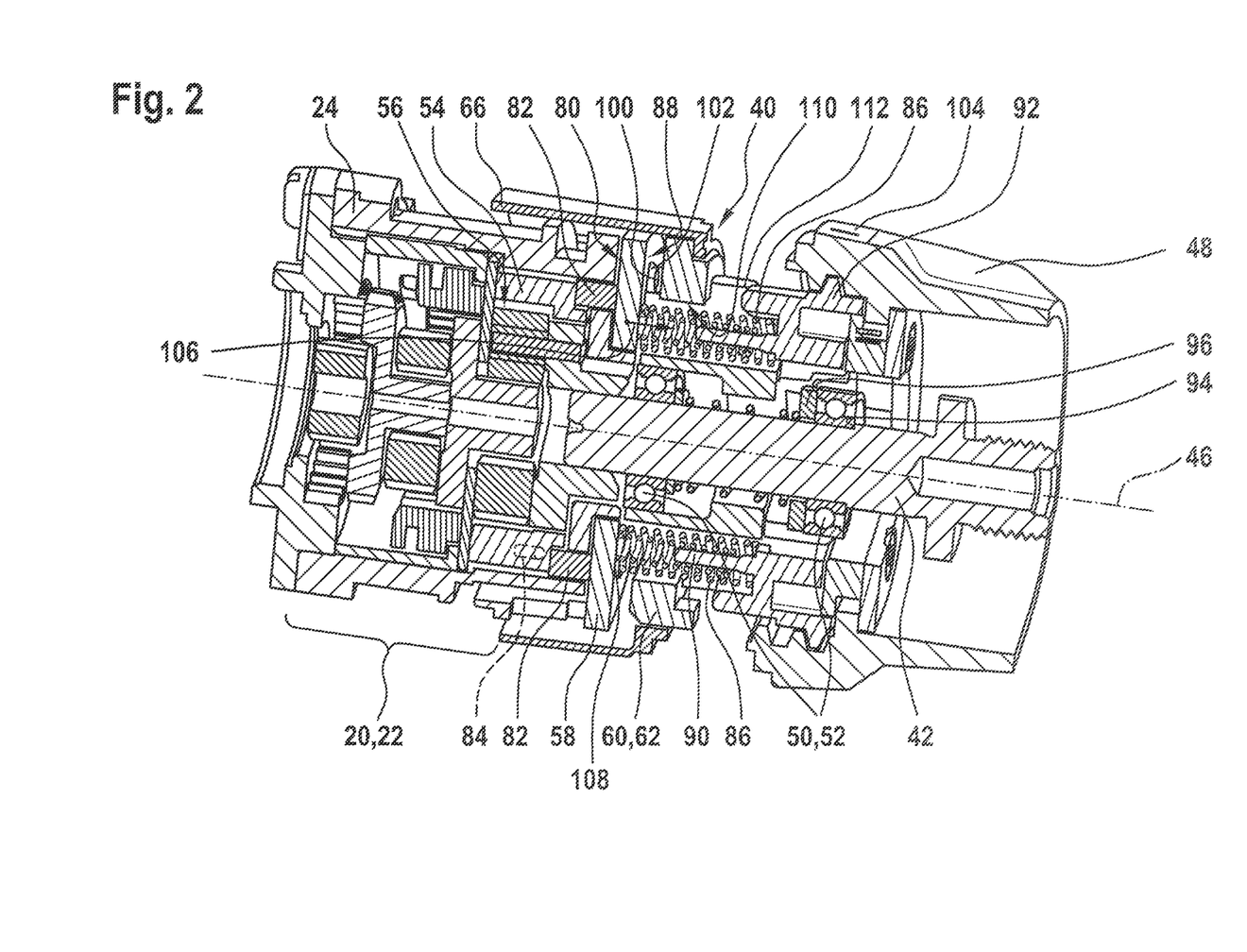
FIG. 2 shows a perspective view of the gear from FIG. 1 together with the torque clutch from FIG. 1 according to one alternative specific embodiment.

FIG. 2 shows gear 20 from FIG. 1 together with torque clutch 40 from FIG. 1 configured according to one alternative specific embodiment. The gear, as described for FIG. 1, is coupled to annulus gear 54 of last gear stage 56 of planetary gear 22 accommodated in gear housing 24. At least one detent body 82, which may have a spherical or roller-shaped configuration, for example, is situated between annulus gear 54 and a first side 80 of transmission element 58 from FIG. 1, which faces the annulus gear. Annulus gear 54 may include at least one detent cam 84, which may be skipped over when torque clutch 40 is acted on by detent body 82. This is referred to as "slipping" of torque clutch 40.

Transmission element 58 may be axially pretensioned against annulus gear 54 via at least one, and in the illustration six, compression springs, of which only two compression springs 86 are visible here. Free axial ends of compression springs 86 each rest against a second side 88 of transmission element 58 which faces away from gear 20 or three-stage planetary gear 22. For increasing the axial pre-tensioning force or pressing force of transmission element 58, which may be used or configured as a pressure plate, a further cylindrical compression spring, not indicated for better clarity in the drawing, is coaxially accommodated here in each of the cylindrical compression springs 86.

Ends (not indicated) of (outer) compression springs 86 facing away from transmission element 58 are each accommodated on a finger-like extension 90 of a spring retainer 92, and are thus reliably guided in the radial direction. An axial position of the spring retainer 92, and thus a level of the axial pretensioning of transmission element 58, may be varied by the user rotating adjusting ring 48 from FIG. 1 about longitudinal center axis 46. Due to axial displacement of spring retainer 92 in the direction of gear 20, the axial pretensioning of transmission element 58 against detent body 82 resting on annulus gear 54 is increased, and vice versa. Due to the increase in axial pretensioning, a torque above which torque clutch 40 responds or slips, in which the at least one detent body 82 skips over detent cam 84 of annulus gear 54, is increased, or conversely, decreased. Compression springs 86, configured as cylindrical springs, allow elastic axial yielding of transmission element 58 in a direction facing away from gear 20 when torque clutch 40 responds, so that the at least one detent cam 84 of annulus gear 54 may be skipped over by the at least one detent body 82, and output spindle 42 from FIG. 1, which is supported in the two bearings 50, 52, which may be configured as roller bearings and particularly may be as radial ball bearings, and which are axially spaced apart from one another, so that the output spindle is at least rotatable about longitudinal center axis 46, comes to a standstill, and no further transmission of torque with the aid of torque clutch 40 takes place.

As described for FIG. 1, locking ring 62 of torque clutch 40 in its first operating position, which may be associated with a screwdriving mode, enables the axial displaceability of transmission element 58 in order to activate torque clutch 40, while locking ring 62 in its second operating position, which may be associated with a drilling mode, at least limits and may completely block the axial movability of transmission element 58 in order to deactivate torque clutch 40. In addition, torque clutch 40 configured according to the alternative specific embodiment in FIG. 2 allows a third operating position of locking ring 62. In this third operating position, once again the axial movability of transmission element 58 is at least limited and may be completely blocked in order to deactivate torque clutch 40, and in addition, the axial position fixing of second bearing 52 is discontinued only in the third operating position, so that axial displaceability of output spindle 42 from FIG. 1 is made possible.

When torque clutch 40 according to the alternative specific embodiment in FIG. 2 is used, hand-held power tool 10 from FIG. 1 may thus be provided with a percussion mechanism, not illustrated but well known to those skilled in the art from the related art, which is set into operation when torque clutch 40 is inactive or deactivated and output spindle 42 is axially displaceable. In this regard, the third operating position of locking ring 62 is associated with a percussion drilling mode in which the axial position fixing of second bearing 52 is discontinued, so that output spindle 42 may move back and forth, at least slightly, in the axial direction in a percussive-pulsing manner.

To make this possible, second bearing 52 may be axially fixed between a circumferential shoulder 94 of output spindle 42 and a position fixing element 96, which may be configured as a so-called tripod. The actuation or enabling of tripod 96 takes place according to the present invention with the aid of locking ring 62 or locking element 60 from FIG.

Figure 3:
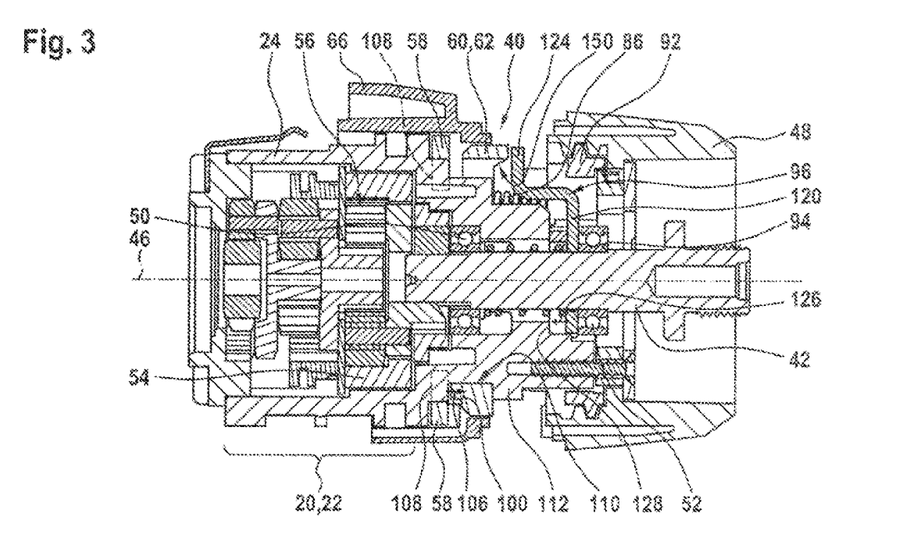
FIG. 3 shows a top view of a longitudinal section of the gear together with the torque clutch from FIG. 2.

1 (see FIG. 3). In the exemplary embodiment illustrated in FIG. 2, locking ring 62 is in its first operating position in which the axial displaceability of transmission element 58 is enabled, but tripod 96 is in a fixing position in which the axial position fixing of second bearing 52 is provided, so that output spindle 42 is immovable in the axial direction, and the percussion drilling mode is thus inactive. Rather, the screwdriving mode is active, as described for FIG. 1.

According to one specific embodiment, locking ring 62 includes at least one support element 100. Support element 100, formed on the end-face side of locking ring 62, may be oriented in the direction of gear 20.

Transmission element 58, which is accommodated, which may be secured against rotation, in gear housing 24 and thus only axially movable, has at least one recess 102. This recess may have an approximately circular segment geometry.

Locking ring 62 is accommodated, which may be secured against rotation, in adjusting element 66 from FIG. 1. Locking ring 62 may thus likewise be easily and sensitively rotated by the user turning adjusting element 66. In FIG. 2, locking ring 62 is in its first operating position, mentioned briefly above, and torque clutch 40 is in the screwdriving mode in which the at least one recess 102 in transmission element 58 may accommodate the at least one support element 100 of locking ring 62 when transmission element 58 is axially displaced, and support element 100 may engage in recess 102. In the event that a preset torque is exceeded, this ensures that the at least one detent body 82 may skip over the at least one detent cam 84 on annulus gear 54, and that transmission element 58 may yield axially in a direction facing away from gear 20. When torque clutch 40 is activated and a maximum torque, which is preselected with the aid of adjusting ring 48 and a scale 104 which may be situated thereon, is exceeded, transmission element 58 thus undergoes an axial lift 106 in a direction facing away from gear 20.

Due to the rotation of locking ring 62 by a suitable rotational angle with the aid of adjusting element 66, the locking ring is rotated into its second operating position in which the engagement of the at least one support element 100 of locking ring 62 in the at least one recess 102 in transmission element 58 is prevented by at least one projection 108 of transmission element 58, or by transmission element 58 itself. Axial lift 106 in a direction facing away from gear 20 is thus limited at least to the extent that the at least one detent cam 84 on annulus gear 54 is no longer able to skip over the at least one detent body 82, and torque clutch 40 is switched over to the drilling mode with torque clutch 40 deactivated. In the drilling mode, the maximum torque which is transmittable by planetary gear 22 may be present at output spindle 42.

By further rotating locking ring 62 by a suitable rotational angle with the aid of adjusting element 66, the locking ring is rotated into its third operating position in which the engagement of the at least one support element 100 of locking ring 62 in the at least one recess 102 in transmission element 58 is once again prevented by the at least one projection 108 of transmission element 58, or by transmission element 58 itself. In addition, locking ring 62 in its third operating position enables tripod 96, so that the axial position fixing of second bearing 52 is discontinued, and torque clutch 40 is switched over to the percussion drilling mode with torque clutch 40 deactivated. In the percussion drilling mode, the maximum torque which is transmittable by planetary gear 22 may likewise be present at output spindle 42.

According to one specific embodiment, a groove 110 with at least one supporting rib 112 may be integrally molded onto gear housing 24, at least in sections, for accommodating locking element 60 or locking ring 62 circumferentially on gear housing 24. In addition, at least one radially outwardly directed extension, which is provided for the rotationally fixed, in particular form-fit, coupling of locking ring 62 to external, ring-shaped adjusting element 66 to be rotated by the user, may be integrally molded onto locking ring 62. At least three extensions, uniformly spaced apart from one another along the periphery, may be formed on locking ring 62 (see FIG. 4).

FIG. 3 shows the arrangement from FIG. 2, with annulus gear 54 of last gear stage 56 of gear 20, configured as planetary gear 22, which drives output spindle 42 via torque clutch 40, the specification of the torque above which activated torque clutch 40 responds or slips being varied with the aid of adjusting ring 48. Output spindle 42 is supported in gear housing 24 so that it is at least rotationally movable about longitudinal center axis 46 with the aid of first and second bearings 50, 52. Locking element 60, which is configured here as locking ring 62 as an example, is accommodated in gear housing 24 by groove 110 and supporting rib 112 in FIG. 2, among other elements, and may be rotated about longitudinal center axis 46 by the user with the aid of adjusting element 66. Torque clutch 40 also includes transmission element 58, which is axially pretensioned in the direction of annulus gear 54 with the aid of compression spring 86 accommodated on spring retainer 92.

Second bearing 52 rests on shoulder 94 of output spindle 42 and on a first leg 120 of tripod 96 which extends at a right angle to longitudinal center axis 46, and is thus axially fixed so that output spindle 42 is likewise axially immovable, and the percussion drilling mode is therefore inactive. In this case, locking ring 62 has assumed a rotational position with respect to longitudinal center axis 46 in which support element 100 rests against gear housing 24 in the illustration, so that support element 100 may engage in the at least one recess 102, not visible here, in transmission element 58, so that torque clutch 40 may slip and carry out axial lift 106 when the torque which is preselected with the aid of adjusting ring 48 is reached. This means that the at least one detent body 82 from FIG. 2 may skip over the at least one detent cam 84 from FIG. 2 of annulus gear 54 (neither of which is visible here), as described for FIG. 2, since an elastic axial yielding of the at least one detent body 82 resting against transmission element 58, and thus of transmission element 58 itself, is possible in a direction facing away from gear 20, and torque clutch 40 is thus in the screwdriving mode.

According to one specific embodiment, at least one run-up ramp 150 is formed, which may be integrally, on locking ring 62, against which a second leg 124 of tripod 96 approximately rests as illustrated here. Second leg 124 of tripod 96 is offset in parallel to first leg 120 on tripod 96 in the direction of gear 20, resulting in an approximately Z-shaped geometry of tripod 96. Due to the rotation of locking ring 62 out of the plane of the drawing, second leg 124 of tripod 96 slides down on run-up ramp 150, thus displacing tripod 96 and thus also its first leg 120 by an axial lift 126 in the direction of planetary gear 22 or gear 20. The axial position fixing of second bearing 52, and thus of output spindle 42, is thus discontinued and the percussion drilling mode is activated. At the same time, torque clutch 40 remains in the inactive or deactivated state as described above. Due to the at least one run-up ramp 150, a rotational motion of locking ring 62 is transformed into a translational displacement motion of tripod 96 along longitudinal center axis 46.

Figure 4:
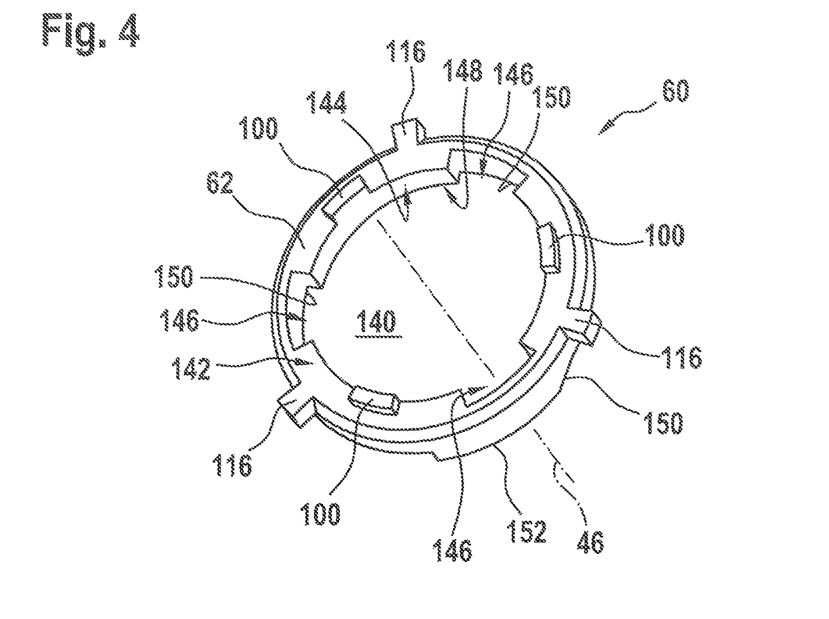
FIG. 4 shows a perspective view of a locking element of the torque clutch from FIGS. 1 through 3, configured as a locking ring as an example.

FIG. 4 shows locking element 60 of torque clutch 40 from FIGS. 1 through 3 according to one specific embodiment, which as illustrated has an essentially hollow cylindrical shape which is symmetrical with respect to longitudinal center axis 46, and has a circular central opening 140. On a first side 142 facing gear 20 in FIGS. 1 through 3, three, as an example here, support elements 100 are integrally formed on locking ring 62. These support elements 100 may be circumferentially offset uniformly with respect to one another, and thus in the present illustration, by 120°, and have an approximately circular segment peripheral geometry in each case. Ends of support elements 100, not indicated, may be beveled in a semicircular shape in each case in order to facilitate the lateral run-up against the projections of transmission element 58 in FIGS. 1 through 3 (see FIG. 5).

For mounting locking ring 62 on gear housing 24 of hand-held power tool 10 in FIG. 1, three recesses 146, which may be likewise uniformly spaced circumferentially with respect to one another, may be provided in each case between two adjacent support elements 100 in a cylindrical inner face 144 of opening 140. Three wedge-shaped run-up ramps 150 for axially displacing tripod 96 in FIGS. 2 and 3, and thus for activating and deactivating the percussion drilling mode as described in FIGS. 2 and 3, may also be provided on a second side 148 of locking ring 62 facing away from first side 142 and the gear. Run-up ramps 150 each merge into an associated planar face, of which only one planar face 152 is indicated in the illustration.

Planar faces 152 may extend in parallel at a distance from one another or elevated in relation to second side 148 of locking ring 62. The radiant or radially outwardly directed, and in each case approximately cuboidal, extensions 116, which may be three in the present case, are used for connecting locking ring 62 to adjusting element 66 in FIGS. 1 through 3. These three extensions 116 may be uniformly circumferentially spaced apart from one another by an angle of 120°, and may be integrally formed on locking ring 62. The three support elements 100 and the three recesses 146 may be positioned circumferentially offset with respect to one another by an angle of 60° in each case. The three recesses 146 may be likewise circumferentially spaced apart from one another by an angle of 120° in each case, and the three run-up ramps 150 may also be circumferentially spaced apart from one another by an angle of 120° in each case. Locking ring 62 may be made of metal or a high-performance plastic.

Figure 5:
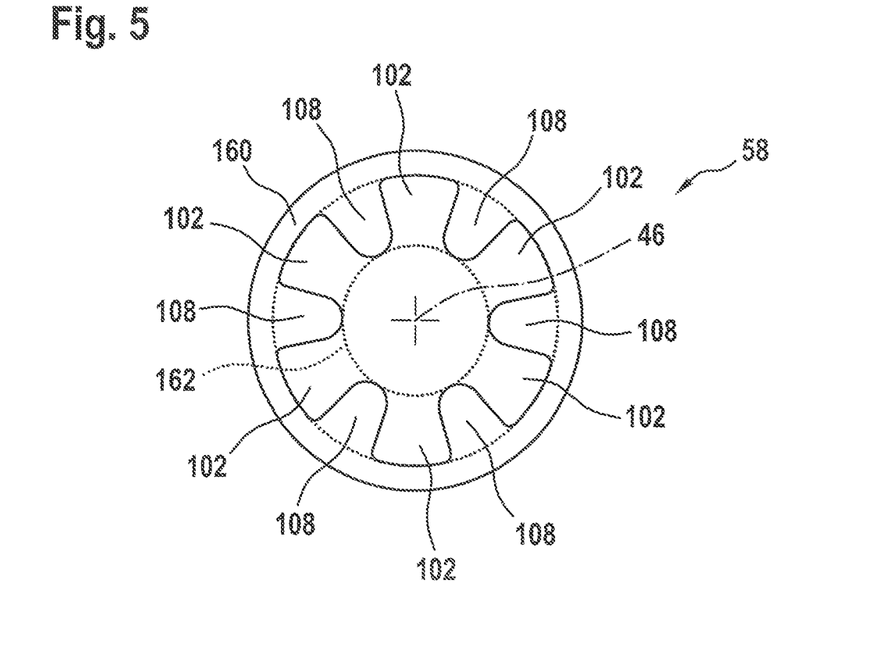
FIG. 5 shows a top view of a transmission element of the torque clutch from FIGS. 1 through 3.

FIG. 5 shows transmission element 58 of torque clutch 40 from FIGS. 1 through 3, having a configuration according to one specific embodiment. The transmission element, as described above, may be used as a pressure plate, and may have a disk-shaped configuration.

According to one specific embodiment, transmission element 58 includes a circular base plate 160 which is symmetrical with respect to longitudinal center axis 46 from FIG. 1. Six, as an example here, radially inwardly directed finger-like projections 108 are formed in one piece on the base plate. These projections 108 may be spaced apart from one another by 60° in each case, an approximately trapezoidal recess 102 in each case being formed between adjacent projections 108, which may have a circular segment shape. Semicircular ends, not indicated for better clarity in the drawing, of projections 108 may each contact an imaginary cylindrical inner face 162 which is likewise centrical with respect to longitudinal center axis 46.

It is pointed out that the specific embodiments described for FIGS. 4 and 5 are provided strictly as examples, and are not to be construed as limiting the present invention. Rather, locking element 60 and transmission element 58, as well as position fixing element 96 from FIGS. 2 and 3, may have a variety of different configurations, as long as the functionalities described above are made possible according to the present invention. For example, the number and configuration of support elements 100, of recesses 146, of run-up ramps 150, and of extensions 116 of locking element 60 may be changed without changing the mode of operation of locking element 60 described above. Similarly, the number and configuration of projections 108 and recesses 102 may also be changed without changing the mode of operation of transmission element 58 described above.

Figure 6:
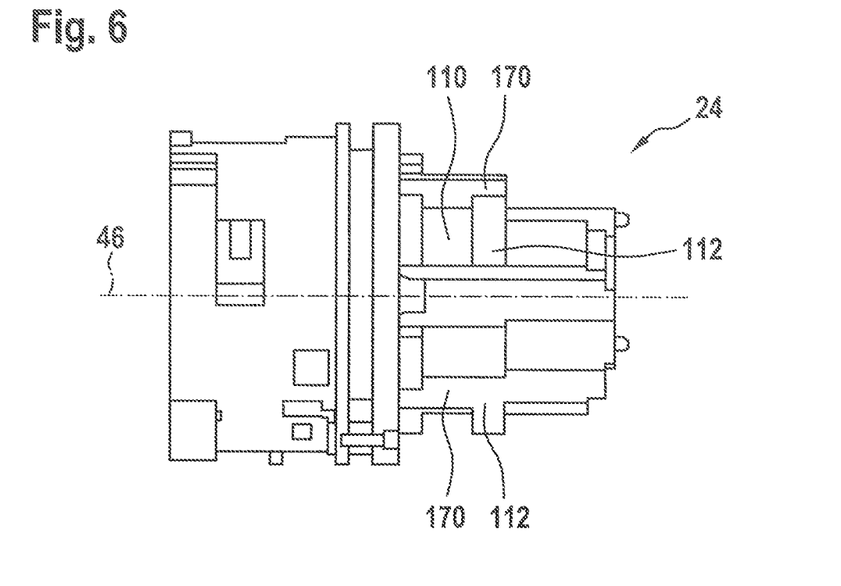
FIG. 6 shows a side view of a gear housing according to the present invention of the hand-held power tool from FIG. 1.

FIG. 6 shows gear housing 24 from FIGS. 1 through 3 according to one specific embodiment. The gear housing may be made in one piece of a plastic material in a casting process, and for accommodating locking ring 62 from FIGS. 1 through 3, not illustrated here, the gear housing includes a groove 110, formed circumferentially at least in sections, and a supporting rib 112, likewise formed at least in sections, which may absorb the high axial forces introduced by the locking ring. At least one, and in the present case, three as an example, reinforcing ribs 170 extending in parallel to longitudinal center axis 46 from FIG. 1 and transversely with respect to supporting ribs 112 may be provided on gear housing 24 for further reinforcement of gear housing 24.

Figure 7:
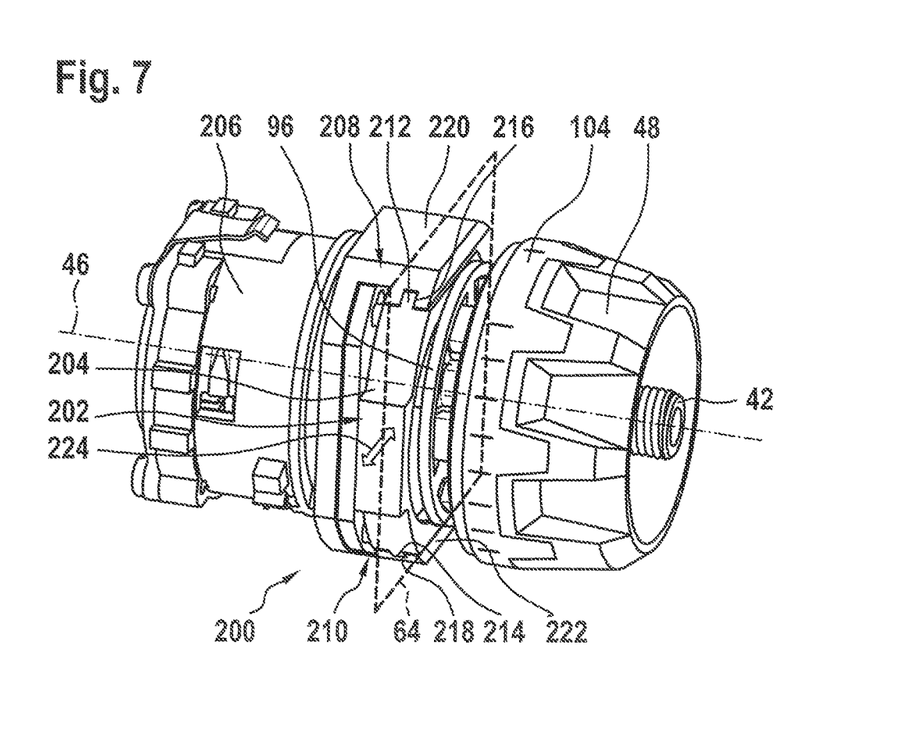
FIG. 7 shows a perspective view of the gear from FIG. 1 together with the torque clutch from FIG. 1, and a locking element which is displaceable transversely with respect to the longitudinal center axis of an output spindle, according to another alternative specific embodiment.

FIG. 7 shows gear 20 from FIG. 1 together with torque clutch 40 from FIGS. 1 through 3, having a configuration according to another alternative specific embodiment. In contrast to the specific embodiments described for FIGS. 1 through 3, the torque clutch includes a locking element 202 which is displaceable transversely with respect to longitudinal center axis 46 of output spindle 42, and is therefore provided with reference numeral 200 here.

Locking element 60 explained with reference to FIGS. 1 through 4 above is illustrated in each case as the at least approximately toroidal locking ring 62, which is rotatable about longitudinal center axis 46 but otherwise axially immovably accommodated in hand-held power tool 10 from FIG. 1 or on its gear housing 24. In contrast, locking element 202 is configured as a slider 204, for example, which is accommodated in a gear housing 206, modified slightly compared to gear housing 24 from FIG. 1, and which is displaceable, transversely in or crosswise relative to longitudinal center axis 46, with respect to (movement) plane 64.

Slider 204 may have an approximately polygonal plate-like shape. For guiding slider 204 in gear housing 206, i.e., parallel to (movement) plane 64, the slider may have two diametrically opposed springs 212, 214 on its top side and bottom side 208, 210. Top side 208 and bottom side 210 of slider 204, apart from springs 212, 214, which may be extend at least approximately in parallel at a distance from one another. As illustrated, springs 212, 214 are accommodated in a form-fit manner, at least in areas, in two mutually facing grooves 216, 218 which are formed on two projections 220, 222 of gear housing 206, which likewise are in parallel to one another and face torque clutch 200 in the direction of adjusting ring 48 from FIG. 1. Tripod 96 from FIGS. 2 and 3 is used once again for activating an associated percussion mechanism or the percussion drilling mode of hand-held power tool 10 from FIG. 1.

In contrast to rotating locking ring 62 from FIGS. 1 through 3, a change between the first, the second, and the third operating positions, i.e., the screwdriving mode, the drilling mode, and the percussion drilling mode, respectively, takes place solely due to the linear movement of slider 204 in relation to gear housing 206 or in parallel to (movement) plane 64, which occurs transversely axially or transversely with respect to longitudinal center axis 46 in the direction of a double arrow 224. In other respects, the mode of operation of torque clutch 200 corresponds to torque clutch 40 explained above, in particular with reference to FIGS. 1 through 5, so that at this point reference is made to the associated portions of the description in order to avoid repetitions.

What is claimed is:

1. A hand-held power tool, comprising:
a gear, in a gear housing, for driving an output spindle, wherein the gear comprises an annulus gear;
a torque clutch associated with the output spindle;
wherein the gear is configured as a planetary gear, at least one detent cam being formed on the annulus gear of a gear stage of the planetary gear facing the torque clutch, wherein the torque clutch comprises a transmission element, wherein the transmission element is axially displaceable in the direction of a longitudinal center axis of the output spindle;
at least one detent body, wherein the at least one detent body is situated between the annulus gear and a side of the transmission element facing the annulus gear, and the transmission element is axially pretensioned against the annulus gear with the aid of at least one compression spring, the at least one compression spring resting against a side of the transmission element facing away from the gear and being supported on an associated spring retainer; and
a locking element, which is configured to be axially immovable in the direction of the longitudinal center axis and which is configured to be movable in a plane transverse to the longitudinal center axis, for activating and deactivating the torque clutch,
wherein at least one support element which points in the direction of the transmission element is formed on the locking element, the support element being formed outside of the locking element on a first end-face of the locking element,
wherein the at least one support element is configured for enabling, in at least a first operating position of the locking element, axial displaceability of the transmission element in the direction of the longitudinal center axis to activate the torque clutch, and in at least a second operating position of the locking element, for at least limiting the axial displaceability of the transmission element to deactivate the torque clutch, in the second operating position of the locking element, the output spindle being at least essentially axially immovable relative to the gear housing in the direction of the longitudinal center axis,
wherein an axial position of the spring retainer is settable with the aid of an adjusting ring, which is rotatable about the longitudinal center axis of the output spindle, to adjust axial pretensioning of the at least one compression spring,
wherein when the torque clutch is activated, the support element on the locking element engages, at least in areas, in a recess in the transmission element so that the detent body skips over the detent cam when a preset torque is exceeded.

2. The hand-held power tool of claim 1, wherein the locking element is configured at least for limiting, in at least a third operating position, the axial displaceability of the transmission element to deactivate the torque clutch, the output spindle in the third operating position of the locking element being axially movable relative to the gear housing in the direction of the longitudinal center axis.

3. The hand-held power tool of claim 2, wherein the first operating position is associated with a screwdriving mode, the second operating position is associated with a drilling mode, and the third operating position is associated with a percussion drilling mode.

4. The hand-held power tool of claim 1, wherein the locking element is a locking ring which is rotatable about the longitudinal center axis.

5. The hand-held power tool of claim 4, wherein the locking ring is accommodated, secured against rotation, in an associated adjusting element.

6. The hand-held power tool of claim 1, wherein an axial position of the spring retainer is settable with the aid of an adjusting ring, which is rotatable about the longitudinal center axis of the output spindle, to adjust axial pretensioning of the at least one compression spring.

7. The hand-held power tool of claim 1, wherein the transmission element includes at least one recess.

8. The hand-held power tool of claim 1, wherein the locking element includes at least one outwardly directed extension.

9. The hand-held power tool of claim 1, wherein the gear housing has, at least in sections, a groove with at least one supporting rib for accommodating the locking element on its outer periphery in a circumferential direction with respect to the longitudinal center axis.

10. The hand-held power tool of claim 9, wherein the groove and the at least one supporting rib are formed on the gear housing in the circumferential direction with respect to the longitudinal center axis.

11. The hand-held power tool of claim 9, wherein the locking element is situated between the transmission element and the supporting rib in the longitudinal direction with respect to the longitudinal center axis.

12. The hand-held power tool of claim 9, wherein the supporting rib supports the locking element in the longitudinal direction with respect to the longitudinal center axis to absorb axial forces introduced by the locking ring.

13. The hand-held power tool of claim 1, wherein when the torque clutch is deactivated, the support element of the locking element limits an axial lift of the detent body and of the transmission element in a direction facing away from the gear, so that the detent body rests, at least in areas, against the detent cam of the annulus gear to deactivate the torque clutch.

14. The hand-held power tool of claim 1, wherein the locking element is directly or indirectly lockable when the torque clutch is activated.

15. The hand-held power tool of claim 1, wherein the hand-held power tool is a screwdriver.

16. The hand-held power tool of claim 1, wherein the hand-held power tool is a screw drill.

17. The hand-held power tool of claim 1, wherein the transmission element comprises a disc-shaped configuration.

18. A hand-held power tool, comprising:
a gear, in a gear housing, for driving an output spindle, wherein the gear comprises an annulus gear;
a torque clutch associated with the output spindle;
wherein the gear is configured as a planetary gear, at least one detent cam being formed on the annulus gear of a gear stage of the planetary gear facing the torque clutch, wherein the torque clutch comprises a transmission element, wherein the transmission element is axially displaceable in the direction of a longitudinal center axis of the output spindle;

at least one detent body, wherein the at least one detent body is situated between the annulus gear and a side of the transmission element facing the annulus gear, and the transmission element is axially pretensioned against the annulus gear with the aid of at least one compression spring, the at least one compression spring resting against a side of the transmission element facing away from the gear and being supported on an associated spring retainer; and a locking element, which is configured to be axially immovable in the direction of the longitudinal center axis and which is configured to be movable in a plane transverse to the longitudinal center axis, for activating and deactivating the torque clutch, wherein at least one support element which points in the direction of the transmission element is formed on the locking element, the support element being formed outside of the locking element on a first end-face of the locking element, wherein the at least one support element is configured for enabling, in at least a first operating position of the locking element, axial displaceability of the transmission element in the direction of the longitudinal center axis to activate the torque clutch, and in at least a second operating position of the locking element, for at least limiting the axial displaceability of the transmission element to deactivate the torque clutch, in the second operating position of the locking element, the output spindle being at least essentially axially immovable relative to the gear housing in the direction of the longitudinal center axis, wherein the locking element comprises at least one run-up ramp which is situated on a second end-face of the locking element, the second end-face facing away from and situated opposing the first end-face, the at least one run-up ramp pointing towards the output spindle.

19. The hand-held power tool of claim 18, wherein the at least one run-up ramp merges into an associated planar face.

* * * * *